United States Patent
Pfiffner

(10) Patent No.: US 9,057,779 B2
(45) Date of Patent: Jun. 16, 2015

(54) SENSOR DEVICE, SAFETY DEVICE, DOOR AND METHOD FOR MONITORING THE MOVEMENT

(75) Inventor: Martin Pfiffner, Jenins (CH)

(73) Assignee: Cedes AG, Landquart (CH)

( * ) Notice: Subject to any disclaimer, the term of this patent is extended or adjusted under 35 U.S.C. 154(b) by 153 days.

(21) Appl. No.: 13/433,842

(22) Filed: Mar. 29, 2012

(65) Prior Publication Data
US 2012/0292514 A1    Nov. 22, 2012

(30) Foreign Application Priority Data

Apr. 1, 2011 (EP) .................................. 11002739

(51) Int. Cl.
G01S 17/08 (2006.01)
E06B 9/88 (2006.01)
E06B 9/68 (2006.01)

(52) U.S. Cl.
CPC . *G01S 17/08* (2013.01); *E06B 9/88* (2013.01); *E06B 2009/6836* (2013.01); *E05Y 2900/106* (2013.01); *E05Y 2900/11* (2013.01); *E05Y 2800/21* (2013.01); *E05Y 2800/242* (2013.01);
(Continued)

(58) Field of Classification Search
CPC .............. G01V 8/20; G01V 8/12; G01V 8/10; H04N 7/181; H04N 5/144; G01S 17/08; G01S 17/50; G01S 17/93; E06B 2009/6836; E06B 9/88
USPC ........... 250/216, 221, 222.1, 239, 340, 341.7, 250/341.8, 342, 345, 346, 349; 348/152–155; 340/552, 555, 556, 557, 340/567, 565; 356/23, 25, 32–35, 395–398
See application file for complete search history.

(56) References Cited

U.S. PATENT DOCUMENTS 6,218,940 B1    4/2001    Rejc et al.
6,243,006 B1 *  6/2001    Rejc et al. .................... 340/436
(Continued)

FOREIGN PATENT DOCUMENTS

CN    1613020 A    5/2005
DE    197 39 543 A1    3/1999
(Continued)

OTHER PUBLICATIONS

European Search Report (Application No. 11002739.8) dated Sep. 20, 2011.
(Continued)

*Primary Examiner* — Francis M Legasse, Jr.
*Assistant Examiner* — Don Williams
(74) *Attorney, Agent, or Firm* — Burr & Brown, PLLC

(57) ABSTRACT

A sensor device is proposed for monitoring a mobile moving element, guided in a guide, with respect to undesired collisions of the moving element with an object which is located in a monitoring range, having at least two sensors for sensing the object, wherein the sensors comprise a transmitter and a receiver for emitting and receiving electromagnetic rays, wherein the sensors are arranged one next to the other in such a way that they can be mounted parallel to the guide, and the sensors are also oriented in such a way that the rays emitted by them penetrate the monitoring range. In order to enable improved obstacle recognition, the sensors are embodied as distance sensors for determining the distance from the object. In addition, a safety device, a door and a method for monitoring the movement are proposed.

13 Claims, 1 Drawing Sheet

(52) U.S. Cl.
CPC ........... *E05F 15/43* (2015.01); *E05F 2015/436* (2015.01)

(56) References Cited

U.S. PATENT DOCUMENTS

| | | | |
|---|---|---|---|
| 7,034,950 | B2 | 4/2006 | Waschke et al. |
| 7,084,388 | B2 * | 8/2006 | Rejc ..................... 250/221 |
| 2005/0224700 | A1 | 10/2005 | Petra |
| 2008/0084300 | A1 | 4/2008 | Albers et al. |
| 2010/0325959 | A1 | 12/2010 | De Coi et al. |
| 2011/0271602 | A1 | 11/2011 | Bartole |
| 2012/0292514 | A1 | 11/2012 | Pfiffner |
| 2013/0062511 | A1 | 3/2013 | De Coi et al. |
| 2013/0106601 | A1 * | 5/2013 | Leutenegger et al. ........ 340/532 |

FOREIGN PATENT DOCUMENTS

| | | | |
|---|---|---|---|
| DE | 299 01 664 | U1 | 4/1999 |
| DE | 199 46 476 | A1 | 4/2001 |
| DE | 102 03 145 | C1 | 4/2003 |
| DE | 10 2007 050 334 | A1 | 4/2009 |
| EP | 0 902 157 | A2 | 3/1999 |
| EP | 0 935 044 | A2 | 8/1999 |
| EP | 1 933 167 | A2 | 6/2008 |
| EP | 1 243 945 | B1 | 1/2009 |
| EP | 1 841 942 | B1 | 1/2009 |
| EP | 1 241 312 | B2 | 4/2009 |
| EP | 2 053 424 | B1 | 6/2012 |
| EP | 2 048 517 | B1 | 9/2012 |
| EP | 2 506 034 | B1 | 5/2013 |
| JP | 2003-278443 | A | 10/2003 |
| JP | 2003-314875 | A1 | 11/2003 |
| JP | 2005-325537 | A | 11/2005 |
| WO | 2005/010840 | A1 | 2/2005 |
| WO | 2006/111365 | A1 | 10/2006 |
| WO | 2009/052879 | A1 | 4/2009 |
| WO | 2009/090097 | A2 | 7/2009 |

OTHER PUBLICATIONS

European Office Action (Application No. 11002739.8) dated Sep. 30, 2011.

European Office Action (Application No. 11002739.8) dated Jun. 6, 2012.

Chinese Office Action (With English Translation), Chinese Application No. 201210093267.0, dated May 29, 2014 (15 pages).

\* cited by examiner

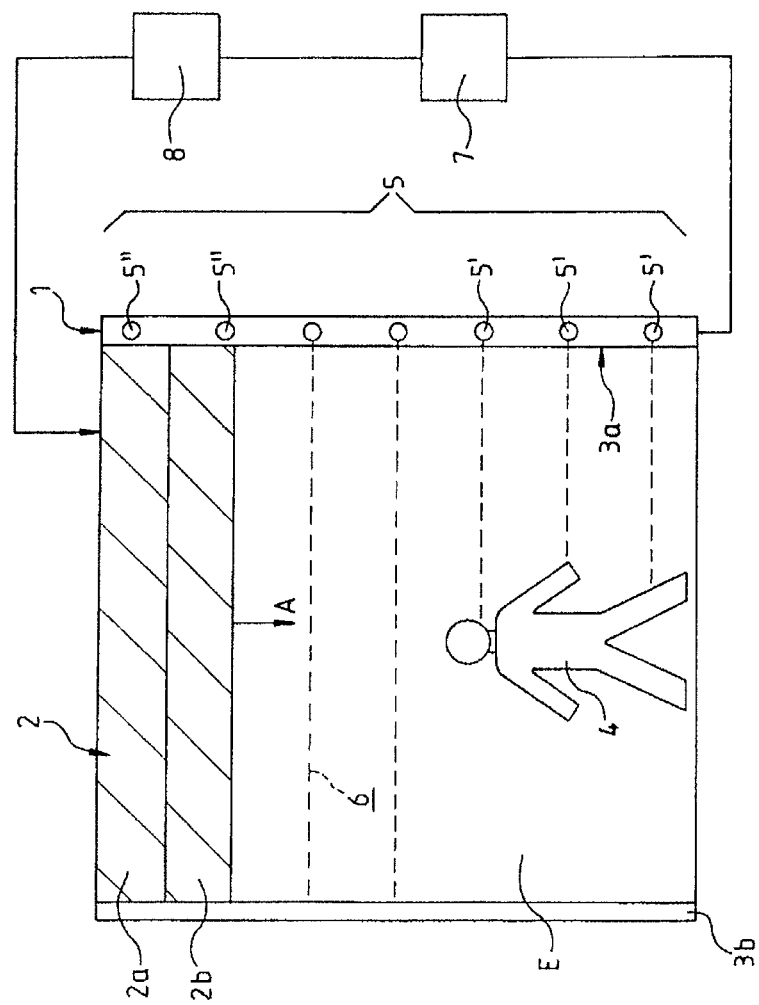

SENSOR DEVICE, SAFETY DEVICE, DOOR AND METHOD FOR MONITORING THE MOVEMENT

BACKGROUND OF THE INVENTION

1. Field of the Invention

The invention relates to a sensor device for monitoring a movable moving element, guided in a guide, with respect to undesired collisions, a safety device, a door and a method for monitoring the movement of a movable moving element, guided in a guide.

2. Description of Related Art

A safety device for motor-powered doors is already known from the prior art, from EP 0 902 157 A2, in which safety device a light curtain may be formed which monitors the closure plane of the door to determine whether objects which could lead to a collision are located therein.

SUMMARY OF THE INVENTION

The object is to provide a sensor device, a safety device, a door and a method for monitoring the movement of a movable moving element, guided in a guide, for protecting against undesired collisions, in which improved detection of an obstacle is made possible.

Accordingly, a sensor device for protecting a mobile moving element, guided in a guide, against undesired collisions is characterized in that the sensors are embodied as distance sensors for determining the distance from the object.

A moving element which is movably guided in a guide may be, for example, a door. During the movement of the moving element, for example when the door is opened and closed, objects may penetrate the monitoring range, for example by persons entering the monitoring range. Basically it is possible to arrange sensors in such a way that they sense the region which is penetrated precisely when the moving element thereof is moved. However, it is often sufficient to arrange the sensors, for example, slightly offset with respect to this movement range of the moving element, in front of it and/or behind it. This arrangement can facilitate the mounting of the sensors and can reduce the risk of damage as a result of the movement of the generally heavy moving element. In these cases, the range which is sensed by the sensors can also be slightly offset with respect to the actual movement range of the moving element without this involving a significant adverse effect on the safety. In the sense of the invention, a monitoring range is under sensed, the monitoring of which is suitable for avoiding the collisions which occur under usual circumstances. It is, for example, conceivable for the monitoring range to comprise merely the movement range, part of the movement range or a region through whose monitoring the usually possible collisions can be sensed, for example if this region is located correspondingly close to the movement range. It is, for example, conceivable to arrange the sensors parallel to the guide, in front of the door opening.

The sensors comprise a transmitter and a receiver for emitting and receiving electromagnetic rays and are arranged and/or oriented in such a way that the rays emitted by them penetrate the monitoring range. The sensors are arranged in a row one next to the other, specifically parallel to the guide, that is to say the sensors can be arranged, for example, within or next to the guide.

In this context, the detection of the object which constitutes an obstacle for the movement of the moving element can be improved by virtue of the fact that the sensors are embodied as distance sensors for determining the distance from the object. Whereas in conventional photo-electric barriers it is only possible to determine that the corresponding light ray is interrupted at some point by an obstacle, in this way it can be more precisely ascertained at what point the corresponding object or obstacle is located.

An additional receiver, which is located opposite the transmitter, or an additional reflector which reflects back the ray emitted by the transmitter, can therefore advantageously be eliminated.

In the case of a door the movement range is, for example, the movement range is a plane, wherein the guide is located within the plane. Accordingly, the sensors can be arranged and oriented in a comparatively simple way.

It is particularly advantageous to integrate the sensors into a strip. This strip can be installed along the guide in a particularly simple way and makes a compact design possible.

One particularly simple embodiment can be achieved by virtue of the fact that at least two of the rays run parallel to one another. The distance between the rays and the sensors can be determined by the application. For example, it is conceivable to arrange the sensors at a distance of approximately 20 cm and to allow the rays to run at a distance of approximately 20 cm.

If a moving element such as a door is guided in a guide, for example a guide rail, the rays can correspondingly run perpendicularly with respect to the guide. However, basically it is also possible to allow the rays to run diagonally, for example when fewer sensors are available and a further region is to be sensed over the diagonal with a small number of sensors. However, it is likewise also possible to use a diagonal ray profile to better sense the monitoring range, in particular when oblique irradiation occurs in addition to the perpendicular irradiation.

One particular preferred development of the invention provides for the sensor device to be embodied as a light curtain. The entire monitoring range, or at least a significant part thereof, can therefore be sensed. It may be advantageous, in particular, depending on the application, to provide sufficient rays which penetrate the space in such a way that most of the obstacles which pass into the movement range are also actually detected. In most moving elements with a guide, for example in the case of guided doors, the light curtain usually describes a plane.

The distance sensors can basically be embodied in different ways, for example as infrared reflection sensors, or as time-of-flight sensors (TOF sensors), or else as 3D-sensors. In addition, an embodiment can provide for various of these sensors to be used in combination. In the case of time-of-flight sensors, a distance measurement can occur by evaluating the propagation time of the light. For this purpose, for example a signal can be modulated onto the emitted light. For example, a lower-frequency oscillation in comparison to the light frequency is modulated onto the light, and the phase shift of the oscillation is measured in order to determine the corresponding distance. Whereas when 2D-sensors are used it is possible to state whether an object is located within the ray under consideration, what are referred to as 3D sensors within a corresponding plane also permit distance values to the object to be supplied. In addition, it is possible to use infrared light sensors since even though the infrared range is basically invisible but infrared sensors can also be used in a variety of ways in technology, these can advantageously basically also be used here.

In addition it is possible for the rays of at least one of the sensors to describe not only a line but rather a conical region, for example in order to improve the sensing of objects.

In many cases it may also be sufficient to arrange the sensors on one side of the movement range. On one hand, this enables a saving of costs, and on the other hand, for example in the case of a distant measurement which runs perpendicularly away from the guide, the same distance to the guide rail is always determined. However, it may also be necessary to arrange the sensors from a plurality of sides when, for example, the extent of the object is to be determined, or how many objects are located in the movement range is to be determined. Since a conventional distance sensor which is mounted on one side of the movement range determines only the distance from the object located in the monitoring range or in its sensing range, it is unclear to what extent the corresponding object on the side facing away from the sensor is still located in the movement range.

It is basically conceivable to provide at least one sensor embodied as a photo-electric barrier in addition to the distance sensors. Such a combination permits the best possible level of safety during the movement of the moving element.

Correspondingly, the safety device according to the invention comprises an electronic unit with which the data determined by the sensors, that is to say measured values or the like, can be read out. A connection between the sensors and the electronic unit can be made in a hard-wired or wireless fashion. In addition, the electronic unit can be integrated into the sensor device, for example the strip. For example, a microcontroller is suitable as the electronic unit.

The electronic unit can pass on instructions or signals. It is conceivable for the electronic unit to be connected to a further monitoring unit for monitoring the movement of the moving element, wherein the monitoring unit can be mounted outside the sensor device. Monitoring means in this context open-loop and/or closed-loop control of the moving element, that is to say the movement of the moving element can be started or ended, if appropriate also accelerated or braked, by means of the monitoring unit. If, for example, the electronic unit transmits a switch-off signal to the monitoring unit since an obstacle has been sensed, this monitoring unit stops the movement of the moving element. It is conceivable for the electronic unit itself also to form the monitoring unit for monitoring the movement of the moving element.

However it is also conceivable for the movement of the moving element to be firstly not stopped but rather only braked by the monitoring unit for example when the moving element is still a sufficiently large distance from the obstacle. If the object or the obstacle is moved out of the movement range in good time, the monitoring unit can, if appropriate, ensure again that the movement of the moving element occurs more quickly.

There is basically the possibility of accommodating the monitoring unit outside the sensor device or integrated in the sensor device. In addition, an electronic unit which interacts with the monitoring unit can be accommodated in the sensor device. However, there is also the possibility of a monitoring unit being connected directly to the sensors outside the sensor device. In particular, in one development of the invention it is possible to infer on the basis of the distance sensors whether in fact the moving element itself or the object is being sensed by the sensors. If, for example, a sensor is arranged in such a way that it measures the distance from the sensed part of the moving element during the movement of the moving element through its monitored range, it is possible to infer from this distance measurement that the moving element itself, and not an obstacle or some other object, has been sensed. This is due to the fact that under usual circumstances obstacles are mostly further away. It is conceivable that the sensor is arranged within the guide itself and accordingly measures a short distance if the moving element is guided through this region of the guide. It is also conceivable that the sensors are mounted near to the guide and part of the moving element passes into the respectively monitored range as soon as the moving element reaches the corresponding location. If the moving element does not project beyond the guide and the sensors are arranged next to the guide, it is possible, for example, for a shutter or clip, which is at a predefined distance from the sensor, to be attached to the moving element.

In order to increase the reliability of detection, in particular the specific distances of a plurality of distance sensors can be compared with one another. If, for example, a door is moved within the guide rail, it is plausible that the moving element, here the door itself, was sensed if exclusively the distances which are typical of the moving element are respectively detected by the sensors above a specific height. An obstacle will typically not penetrate the monitoring range from above in a downward direction or also continue to stay above in the monitoring range in a positionally fixed fashion.

In addition, in one exemplary embodiment of the invention it is possible to determine the direction of movement of the moving element and/or the direction of movement of the object. This is advantageously made possible by the fact that a distance measurement is carried out. On the basis of a subsequent distance measurement it can be determined whether the corresponding distance has changed. This comparison can be carried out, for example, in the monitoring unit. In addition it is possible to correspondingly arrange sensors in such a way that their rays run in the direction of movement of the moving element, and if appropriate, the movement of the moving element can therefore also be detected.

The distance measurement can, however, also be utilized in other ways. For example it may be possible for a plurality of moving elements to be arranged next to one another. In addition it is possible that a corresponding object is located only in the movement range of one of these moving elements. In order to prevent the movement of all moving elements being stopped when the corresponding object is sensed by the sensors, the determination of the distance can be utilized by the distance sensors. It is these distance measurements which permit location of the corresponding object or obstacle to be specifically determined more precisely. How precisely the position of the corresponding object is determined depends on how the corresponding sensors of the sensor device are arranged and which region they can sense.

If the direction of movement of the object is detected in such a development of the invention, it is also possible to infer therefrom which moving element is to be influenced in terms of its speed, or if appropriate is to be stopped. For example, if a person is therefore moving between a plurality of doors, it is possible to infer from the distance or the direction of movement, which moving element is concerned, with respect to its movement space.

In particular, the moving element can be embodied as a door, for example as a rolling door, sectional door or sliding door. Accordingly, a door according to the invention is characterized by the fact that a safety device according to the invention or a corresponding embodiment or development is provided.

In addition, a method for monitoring a movement of a movable moving element, guided in a guide, by means of a safety device according to the invention or a corresponding embodiment or development is characterized in that the method comprises the following method steps:

The data which is determined by the sensors, that is to say the determined distances, are read out, wherein the data can each be assigned the sensor in which they were read out. The respective data are compared with a reference value. This is done, for example, in the electronic unit or in the monitoring unit. A value which is measured when neither an object nor the moving element itself is located in the monitoring range can serve as a reference value. The distance which is measured when the moving element is located in the monitoring range can also serve as a reference value. In addition, in order, for example, to take into account measurement tolerances, it is also possible to define another value. As a result, if appropriate, the reliability of the method can be improved further. It is possible to make comparisons with a reference value or with a plurality of reference values. An evaluation is then made on the basis of the comparisons and on the basis of the position of the sensor which has been assigned to the corresponding data.

For example, when a door is closed it is possible to determine in the chronological profile that one sensor after the other measures, from top to bottom, distances equal to or less than a reference value for a door which is guided in the monitoring range. From this, in the evaluation it is possible to infer that no obstacle has penetrated the monitoring range but rather that the door has merely been closed.

In one development of the invention it is possible for sensors to be correspondingly activated or deactivated. If, for example, the evaluation reveals that a sensor senses the moving door, the sensor can be deactivated, i.e. it is, for example, switched off or else, for example, its measured values are no longer included in the evaluation. The term activation can be understood in an analogous way.

BRIEF DESCRIPTION OF THE DRAWING

An exemplary embodiment of the invention is illustrated in the drawing and will be explained in more detail below with reference to further advantages.

FIG. 1 shows a safety device for a door according to the invention.

DETAILED DESCRIPTION OF THE INVENTION

FIG. 1 shows a safety device having a sensor strip 1 for a sectional door 2, the individual door segments 2a, 2b of which run in guide rails 3a, 3b. The door 2 moves here in the direction of movement according to the arrow A. The movement range of the door 2 with the direction A of movement is described by the plane E. In this frame there is an object 4, here a person. If the movement of door 2 would continue in the direction A, a collision of the door 2 with the person 4 would occur. A sensor strip 1 with distance sensors 5 is mounted along the guide rail 3a, wherein the guide rail 3a is just covered by the sensor strip 1 in FIG. 1. The sensors 5 emit rays 6 and can also receive the reflections thereof again. The rays 6 run perpendicularly to the direction of movement directly before the plane E. The rays therefore run at a short distance from the plane E. In addition, the rays 6 run perpendicularly with respect to the sensor strip 1 and to the guide rail 3a (in the projection of FIG. 1).

The distance sensors 5 are embodied as TOF sensors. In the lower section of the movement range, the rays of the sensors 5' impact on the person 4. These sensors 5' each individually determine the distance between the guide rail 3a in which the respective sensors 5' are located and the respective impact point on the person 4.

It is therefore possible to firstly determine how far the door 2, which moves in the direction A, is still away from the person 4 since it is known how many sensors 5 are still located between the door 2 and the person 4.

The sensors 5" are located in the range which has already been passed through by the door 2 along the guide rail 3a. These sensors 5" therefore determine a distance from a sensed object, specifically part of the door 2, which projects into the monitoring range. The specific distance is therefore only very small and corresponds to a reference value. In addition, during the movement of the door from top to bottom more and more sensors measure this reference value. These sensors 5" therefore permit the conclusion that the sensed object cannot be an obstacle or a person but rather that the door 2 was being sensed.

The sensors 5 can therefore determine, in conjunction with the measurements of the sensors 5' and 5", where the door 2 is located and where, if appropriate, an obstacle 4 is located. In the present case, the movement of the door 2 is stopped since a person 4 stops in the monitoring range, the person 4 having been determined by the sensors 5'.

In this exemplary embodiment, the data are evaluated in a microcontroller which is integrated into the sensor strip 1. This microcontroller is designed to send a switch-off signal to the controller 7 in the case of an obstacle being located in the monitoring range. The controller 7 in turn controls the motor 8 for the movement of the door 2.

If, in addition, a person 4 moves within the plane E, the sensors 5' can determine the direction in which the person 4 is moving and, if appropriate, also the speed of the person 4.

Basically it is conceivable to use the subject matter of the invention not only in the field of doors but also to arrange the subject matter in machines in order to be able to improve machine safety.

LIST OF REFERENCE NUMBERS

1 Sensor strip
2 Door
2a Door segment
2b Door segment
3a Guide rail
3b Guide rail
4 Person
5 TOF sensors
5' TOF sensor (senses person)
5" TOF sensor (senses door)
6 Ray
7 Controller
8 Motor
A Direction of movement of the door
E Plane of movement

The invention claimed is:

1. A sensor device for monitoring a mobile moving element that is guided in a guide to avoid undesired collisions of the moving element with an object, the sensor device comprising:
   at least two sensors for monitoring a movement of the moving element in a movement range of the moving element and detecting the object within a monitoring range of the at least two sensors, each sensor of the at least two sensors comprising:
      a transmitter for emitting electromagnetic rays, and
      a receiver for receiving the electromagnetic rays emitted by the transmitter;
   the at least two sensors arranged one next to the other, mounted parallel to the guide on one side of the movement range of the moving element, and oriented in such a way that the electromagnetic rays emitted by the transmitter penetrate the movement range of the moving element; and an electronic unit for reading out the data determined by the at least two sensors and outputting at least one of instructions and signals, wherein the monitoring range of the at least two sensors includes the movement range of the moving element, and the moving element penetrates the monitoring range during the movement thereof, wherein the at least two sensors are distance sensors, at least a first sensor of the at least two sensors determines a distance from the moving element, during the movement of the moving element through the monitoring range, to the first sensor, and at least a second sensor of the at least two sensors determines a distance from the object, detected within the monitoring range of the at least two sensors, to the second sensor, and wherein the electronic unit infers whether the moving element or the object is detected by comparing the distance determined by at least one of the sensors to a reference value, wherein the reference value is a distance measured from the moving element when the moving element is located in the monitoring range.

2. The sensor device according to claim 1, wherein the sensors are arranged in a strip.

3. The sensor device according to claim 1, wherein at least two of the sensors are oriented in such a way that their rays run parallel to one another.

4. The sensor device according to claim 1, wherein at least one of the sensors is arranged in such a way that its rays run perpendicularly with respect to the guide.

5. The sensor device according to claim 1, wherein at least one of the sensors is an infrared reflection sensor.

6. The sensor device according to claim 1, wherein at least one of the sensors is embodied in such a way that its rays penetrate a conical region.

7. The sensor device according to claim 1, wherein the electronic unit is designed to determine the movement direction of the moving element and of the object by means of the sensor device.

8. The sensor device according to claim 1, further comprising a monitoring unit for monitoring the moving element, which monitoring unit comprises the electronic unit or which can be connected to the electronic unit.

9. A door, in particular a rolling door, sectional door or sliding door, comprising a sensor device according to claim 1.

10. A method for monitoring the movement of a movable moving element, guided in a guide, by means of a sensor device according to claim 1, the method comprises the following method steps:

reading out the data determined by the sensors and assignment of the respective data to the respectively read-out sensor, comparison of the respective data with at least one reference value, and evaluation on the basis of the comparison and on the basis of the position of the assigned sensor.

11. The method according to claim 10, wherein at least one of the sensors is activated and/or deactivated as a function of the evaluation.

12. The sensor device according to claim 1, wherein at least one of the sensors is a time-of-flight sensor.

13. The sensor device according to claim 1, wherein at east one of the sensors is a 3D-sensor.

* * * * *